United States Patent [19]
Cribbs et al.

[11] Patent Number: 6,121,183
[45] Date of Patent: Sep. 19, 2000

[54] MODIFIED POLYSILOXANE CATALYSTS AND A METHOD OF USING THE SAME

[75] Inventors: Leonard V. Cribbs, Houston, Tex.; John A. Tyrell, Williamsville; Sandor Nagy, Grand Island, both of N.Y.

[73] Assignee: Equistar Chemicals, L.P., Houston, Tex.

[21] Appl. No.: 08/859,319

[22] Filed: May 20, 1997

Related U.S. Application Data

[63] Continuation-in-part of application No. 08/654,435, May 28, 1996.

[51] Int. Cl.$^7$ .................................. C08F 4/42; C08F 4/58
[52] U.S. Cl. .......................... 502/158; 502/152; 502/155; 502/159
[58] Field of Search ..................................... 502/152, 155, 502/158, 159

[56] References Cited

U.S. PATENT DOCUMENTS

| | | | |
|---|---|---|---|
| 5,473,020 | 12/1995 | Peifer et al. | 525/243 |
| 5,626,968 | 5/1997 | Priou | 428/447 |
| 5,677,255 | 10/1997 | Soga et al. | 502/111 |

FOREIGN PATENT DOCUMENTS

| | | |
|---|---|---|
| 0725 086 | 8/1996 | European Pat. Off. . |
| 0 372 414 | 6/1990 | Germany . |
| 196 36 233 | 3/1997 | Germany . |

OTHER PUBLICATIONS

Macromolecular: Rapid Communications, vol. 16, No. 12, pp. 905–911, XP000583889, Soga et al: "Olefin Polymerization with Metallocene Catalysts Supported on Polysiloxane Derivatives", Dec. 1, 1995.

Macromolecular: Rapid Communications, vol. 16, No. 12, Dec. 1, 1995, pp. 905–911, XP000583889, Kazuo Soga et al.: "Olefin Polymerization with Metallocene Catalysts Supported on Polysiloxane Derivatives".

*Primary Examiner*—Yogendra Gupta
*Assistant Examiner*—Brian P. Mruk

*Attorney, Agent, or Firm*—John Wilson Jones; Jonathan L. Schuchardt

[57] ABSTRACT

Catalysts for the polymerization of olefins contain units of the formula: wherein

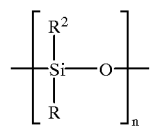

each R is independently selected from a $C_1$ to $C_{10}$ aliphatic or cycloaliphatic group or a $C_6$ to $C_{18}$ aryl, aralkyl, or alkaryl;

each $R^2$ is independently selected from hydride, R, and Q radicals wherein at least one $R^2$ is Q;

Q has the general formula $$LM^pL'_rX_{p-r-1}$$

wherein

L is a monoanionic aromatic ancillary ligand pi-bonded to M and covalently bonded to Si;

L' is a monoanionic aromatic ancillary ligand pi-bonded to M and optionally bonded to L through a covalent bridging group;

M is a metal selected from Groups 3–10 of the Periodic Table or lanthanides;

X is independently selected from a hydride radical, halide radical, hydrocarbyl radical, halocarbyl radical, silahydrocarbyl, alkoxy radical, aryloxy radical, alkylsulfonate radical, arylsulfonate radical or $(R)_2N$— radical; or two X groups are joined with M to form a metallacycle, silametallacycle or pi-diene metallacycle moiety;

p is the valence of M;

r is 0 or 1; and n is an integer between about 10 and about 500.

5 Claims, No Drawings

MODIFIED POLYSILOXANE CATALYSTS AND A METHOD OF USING THE SAME

RELATED APPLICATION

This is a continuation-in-part of U.S. patent application Ser. No. 08/654,435 filed May 28, 1996.

FIELD OF THE INVENTION

The invention relates to novel catalysts and the use of the catalysts in the polymerization of olefins. The catalyst of the invention contains units of the formula:

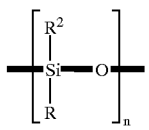

(I)

wherein each R is independently selected from a $C_1$ to $C_{20}$ aliphatic or cycloaliphatic radical, $C_6$–$C_{30}$ aryl radical, or $C_7$–$C_{30}$ aralkyl or alkaryl radical;

each $R^2$ is independently selected from hydride, R, and Q radicals wherein at least one $R^2$ is Q;

Q has the general formula:

$LM^pL'_rX_{p-r-1}$ (II)

wherein

L is a monoanionic aromatic ancillary ligand pi-bonded to M and covalently bonded to Si;

L' is a monoanionic aromatic ancillary ligand pi-bonded to M and optionally bonded to L through a covalent bridging group Z;

M is a metal selected from Groups 3–10 of the Periodic Table or lanthanides;

X is independently selected from a hydride radical, halide radical, hydrocarbyl radical, halocarbyl radical, silahydrocarbyl radical, alkoxy radical, aryloxy radical, alkylsulfonate radical, arylsulfonate radical, or $(R)_2N$— radical; or two X groups may be joined with M to form a metallacycle, silametallacycle, or pi-diene metallacycle moiety;

p is the formal valence of M;

r is 0 or 1;

p-r-1≧1; and n is an integer between about 10 to about 500.

In a preferred embodiment, L and/or L' is (i.) a cyclopentadienyl or substituted cyclopentadienyl ring;

(ii.) a boraaryl derivative; or (iii.) a 1,2-azaborolinyl ring; or (iv.) a five-membered heterocyclic ring containing at least one Group 15 atom.

The catalyst of the invention may be characterized as the reaction product of a silicone oil derivative of the formula:

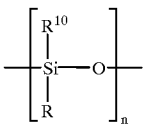

(III)

and a compound of the formula

$M^pL^4_rX'_{p-r}$ (IV)

wherein each $R^{10}$ is independently selected from —H, R, and $L^3$; at least one $R^{10}$ being $L^3$ wherein $L^3$ is a monoanionic aromatic moiety covalently bonded to Si; $L^4$ is a monoanionic aromatic ancillary ligand pi-bonded to M; X' is independently selected from a hydride radical, halide radical, alkoxy radical, aryloxy radical, alkysulfonate radical, arylsulfonate radical, or $R_2N$— radical, and R, M, p and r having the meanings set forth above.

BACKGROUND OF THE INVENTION

Metallocene catalysts are a new class of catalysts which are gradually replacing Ziegler catalysts for the polymerization of olefins, such as ethylene and propylene. A metallocene catalyst typically consists of a transition metal compound bonded to at least one ligand that contains a cyclopentadienyl ring. While such catalysts are more expensive than Ziegler catalysts, they are much more efficient. Recently, catalysts containing boraaryl and azaborolinyl rings have been proposed as alternatives to metallocene catalysts.

Typically, unsupported catalyst systems have too small a particle size for commercial use. Supported catalysis systems are characterized by larger particle sizes and offer improved catalytic efficiency over their unsupported counterparts. Supported catalysis systems further are generally more stable.

It is often difficult to control the amount of catalyst loaded onto the supports of the prior art. This is unfortunate in light of the high manufacturing costs of the catalyst itself. In addition, the supported catalysis systems of the prior art exhibit a high degree of self-deactivation; presumably caused by close proximity of the active sites on the support. A need therefore exists for more cost efficient catalysis systems which exhibit a diminished risk of deactivation.

SUMMARY OF THE INVENTION

The invention relates to a catalyst system containing an olefin polymerization catalyst containing at least one Group 3 to Group 10 transition metal or one of the Actinide series of the Periodic Table bound through a ligand to a silicon atom of a support. The support consists of a modified silicone oil.

The catalyst system of the invention exhibits a higher degree of thermal stability than the unsupported catalysts of the prior art. The enhanced thermal stability makes the catalysts of the invention suitable for use at higher temperatures, such as in the solution polymerization of ethylene. The possibility of deactivation of catalysts of the invention is small.

The supported catalysts of the invention are further soluble in conventional organic solvents. As a result, the catalysts of the invention are far easier to use than the catalysts of the prior art. In addition, the amount of catalyst reacted with support can easily be controlled.

Further, the activity of the catalysts of the invention is comparable to that of the unsupported catalysts of the prior art.

DESCRIPTION OF THE PREFERRED EMBODIMENTS

The catalysts of the invention may generically be described by the formula:

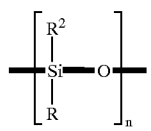

(I)

wherein each R is independently selected from a $C_1$ to $C_{20}$, preferably a $C_1$ to $C_6$, aliphatic or cycloaliphatic radical; a $C_6$–$C_{30}$, preferably a $C_6$–$C_{15}$, aryl radical, or a $C_7$–$C_{30}$, preferably a $C_7$–$C_{15}$, aralkyl or alkaryl radical;

each $R^2$ is independently selected from hydride, R, and Q radicals wherein at least one $R^2$ is Q;

Q may be of the general formula:

$$LM^pL'_rX_{p-r-1}$$ (II)

wherein

L is a monoanionic aromatic ancillary ligand pi-bonded to M and covalently bonded to Si;

L' is a monoanionic aromatic ancillary ligand pi-bonded to M and optionally bonded to L through a covalent bridging group Z;

M is a metal selected from Groups 3–10 of the Periodic Table or lanthanides, preferably a Group 4 to 6 metal, most preferably zirconium, hafnium or titanium;

X is independently a hydride, halide, hydrocarbyl, halocarbyl, silahydrocarbyl, alkoxy, aryloxy, alkylsulfonate, arylsulfonate, or $(R)_2N$—; or two X groups may be joined with one to fifteen carbon atoms, M to form a metallacycle, silametallacycle, or π-diene metallacycle moiety;

p is the formal valence of M;

r is 0 or 1;

p-r-1≧1; and n is an integer between about 10 to about 500, preferably about 10 to about 100.

As used herein, the term "halide" is preferably a —Cl or Br; the term "hydrocarbyl" preferably contains one to about fifteen carbon atoms; the term "halocarbyl" preferably contains chlorine and/or bromine and from one to about fifteen carbon atoms; the term "alkoxy" is preferably of the formula —OR; and the term "aryl" preferably contains about six to about thirty carbon atoms.

The term "metallacycle" refers to a cyclic radical containing one or more M atoms, preferably one M atom, and an alkylene group. Typically, the metallacycle is of the formula —M $(CH_2)_g$ wherein g is 2 to about 10, preferably 2 to about 6.

The term "silametallacycle" refers to a cyclic radical containing one or more M atoms, preferably one M atom, one or more Si atoms, preferably one Si atom, and an alkylene group. Typically, the silametallacycle is of the formula —M $(CH_2)_t$ Si $(CH_2)_v$ wherein t and v are independently selected from 0 to about 4, preferably 0 to about 6, provided that v≠0.

The term "π-diene metallacycle" refers to an acyclic or cyclic radical containing one or more M atoms, preferably one M atom, and a diene group. Typically the π-diene metallacycle is a cyclic, delocalized η-bonded group comprising a neutral, conjugated diene, optionally substituted with one or more hydrocarbyl groups, containing up to 40 carbon atoms. Such groups are described in U.S. Pat. No. 5,512,693 herein incorporated by reference.

The term "aromatic ancillary ligand" as used herein shall refer to bulky aromatic ring structures which are relatively stable during polymerization conditions. In other words, such ring structures are non-labile.

Preferred catalysts of the invention are those wherein the aromatic ancillary ligand of L and L' are independently selected from the group consisting of:

(i.) a cyclopentadienyl or substituted cyclopentadienyl ring represented by the formula:

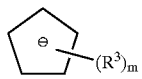

(V)

wherein each $R^3$ is independently selected from R; hydrogen; halogen, preferably containing chlorine or bromine; a halocarbyl, such as haloalkyl or haloaryl; $M^2(R^4)_3$, —$OM^2(R^4)_3$, —$M^2(OR^4)_3$, —$M^4(R)$ or —$M^3(R^4)_2$ wherein $M^2$ is Si, Ge, or Sn and $R^4$ is halogen, hydrogen or R, preferably a —Cl, —Br or a $C_1$ to $C_6$ alkyl group; $M^3$ is a Group 15 element; M' is a Group 16 element; cyano radicals; or two adjacent R groups are joined to form a $C_4$ to $C_{10}$ ring; and m is the number of substituents on the cyclopentadienyl rings. In a preferred embodiment $M^2$ is Si, $M^3$ is —N or —P; and $M^4$ is —O or —S;

(ii.) a boraaryl derivative containing the unit:

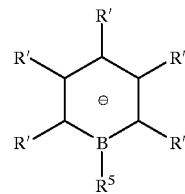

(VI)

(iii.) a 1,2-azaborolinyl ring of the formula:

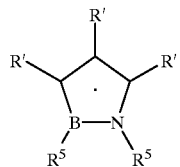

(VII)

(iv.) a heterocyclic radical of the formula:

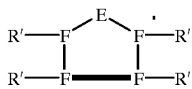

(VIII)

wherein
R' is independently hydride or R or R' with F forms a $C_4$ to $C_{10}$ fused ring;
$R^5$ is independently R', —Si(R)$_3$, —$M^4$(R), —$M^3$(R)$_2$; and wherein two adjacent R groups may be joined to form a $C_4$–$C_{10}$ ring;
E independently represents a trivalent atom selected from nitrogen, phosphorus, arsenic, antimony and bismuth; and
F is independently selected from carbon and E.

Compounds of formulae (VI) and (VII) include those wherein R' is —H or a $C_1$ to $C_3$ alkyl group and $R^5$ is hydrogen, a $C_1$ to $C_3$ alkyl group, —Si(R)$_3$ or —$M^3$($R^4$)$_2$.

Preferred as covalent bridging group Z is a radical of the formula —[(R')$_2$ $M^5$]$_s$, where R' has the meaning set forth above, each $M^5$ is a Group 14 element, and s is an integer from 1 to about 4; —[(R')$_2$ $M^5$]—$M^4$—[(R')$_2M^5$]— or a radical of the formula —$M^6$(R)— or —$M^3$(R)—, where $M^6$ is a Group 13 element; —Ge—, —Sn—, —O—, —S—, =CO, =SO, =SO$_2$, or =P(O)R. In a preferred embodiment, $M^5$ is carbon or silicon; $M^6$ is —B or —Al; and $M^3$ is —N or —P.

Especially preferred are dialkyl germanium or silicon, preferably a $C_1$–$C_4$ alkyl group. Groups that are most preferably used to bridge two ligands include dimethyl silyl, diphenyl silyl; diethyl silyl, and methyl phenyl silyl. Normally, only a single bridge is used in a catalyst.

Further suitable as the Q radical for $R^2$ of formula (I) are those substituents which render a "constrained geometry" configuration. Such catalysts comprise a metal coordination complex of a metal and a delocalized pi-bonded moiety substituted with a constrain-inducing moiety; the complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent. Such complexes further comprise more than one delocalized, substituted pi-bonded moiety, wherein only one thereof for each metal atom of the complex is a cyclic, delocalized, substituted pi-bonded moiety.

Representative of such Q substituents are those of the formula (IX)

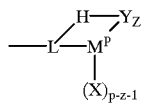

(IX)

wherein
L is preferably (i.)–(iv.) defined above;
Y is —$M^8$—, —$M^3$(R)—, or —$M^5$(R)$_2$; $M^8$ is a Group 16 element, preferably —O or —S; $M^3$ is a Group 15 element, preferably —N or —P; and $M^5$ is a Group 14 element, preferably carbon or silicon;
H is a radical of the formula —[(R')$_2M^5$]$_s$, —[(R')$_2M^5$]—$M^8$—[(R')$_2M^5$], —$M^6$(R), or —$M^3$(R), s is an integer from 1 to about 4;

$M^5$, R', $M^8$, $M^5$, $M^6$ and $M^3$ are as defined above;
z is 0 or 1;
p-z-1 is $\geq$1;
where further wherein
two or more R or R' groups from Y, H, or both Y and H may form a fused ring system.

Exemplary of such complexes are amidosilane-or amidoalkanediyl-compounds corresponding to the formula:

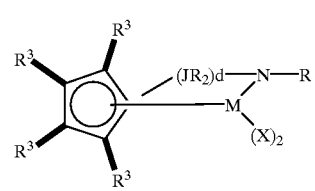

(X)

wherein M is bound in a $\eta^5$ bonding mode to the Cp group;
M, m, $R^3$ R and X as defined above;
J is silicon or carbon; and
d is 1 or 2.

Further, examples of such complexes include those wherein R is methyl, ethyl, propyl, butyl, pentyl, hexyl, (including isomers), norbornyl, benzyl, phenyl, etc.; and the cyclopentadienyl group is cyclopentadienyl, indenyl, tetrahydroindenyl, fluorenyl, octahydrofluorenyl, etc. Specific compounds include (tert-butylamido)(trimethyl-$\eta^5$-cyclopentadienyl)-1,2-ethanediylzirconium dichloride, (tert-butylamido) (trimethyl-$\eta^5$-cyclopentadienyl)-1,2-ethanediyltitanium dichloride, (methylamido) (trimethyl-$\eta^5$-cyclopentadienyl)-1,2-ethanediylzirconium dichloride, (methylamido) (trimethyl-$\eta^5$-cyclopentadienyl)-1,2-ethanediyltitanium dichloride, (ethylamido) (trimethyl-$\eta^5$-cyclopentadienyl)-methylenetitanium dichloro, (benzylamido)dimethyl (trimethyl-$\eta^5$-cyclopentadienyl) silanetitanium dichloride, etc.

Especially suited as the cyclopentadienyl or substituted cyclopentadienyl rings of formula (V) are those of the formulae (XII)–(XIII):

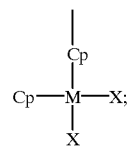

(XII)

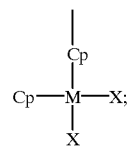

(XIII)

wherein Cp is of the formula (V) above. In a particularly preferred embodiment of the invention, both L and L' are Cp.

The catalysts of the invention represented by units of the formula (I) above are preferably further characterized as having a ratio of R:H+L in $R^2$ between 0 to 5.

Exemplary of the L or L' ligands of formula (VIII) are 2-methylpyrrolyl, 3-methylpyrrolyl, 2,5-dimethylpyrrolyl, 2,5-di-tert-butylpyrrolyl, aryl substituted pyrrolyl rings such as 2-phenylpyrrolyl, 2,5-diphenylpyrrolyl, indolyl and alkyl substituted indolyls of the formula:

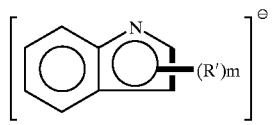
(XIV)

such as 2-methylindolyl, 2-tert-butylindolyl, 3-butylindolyl, 7-methylindolyl, and 4,7-dimethylindolyl and carbazolyl and alkyl substituted carbazolyls of the formula:

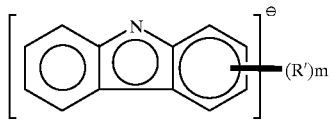
(XV)

In the formulas, each R' is preferably independently selected from hydrogen, alkyl from $C_1$ to $C_{10}$, and aryl from $C_6$ to $C_{10}$. (The alkyl and aryl substituents on the pyrrolyl ring-containing ligand are not on the nitrogen atom in the ring but are on the carbon atoms of the ring.)

Additional ring structures include:
(1-Phospha-2,3,4,5-tetramethylcyclopentadienyl)zirconium trichloride,
(1-Phospha-2,3,4,5-tetramethylcyclopentadienyl)zirconium trimethyl,
(1-Phospha-2,3,4,5-tetramethylcyclopentadienyl)zirconium tribenzyl,
(1-Phospha-2,3,4,5-tetramethylcyclopentadienyl)zirconium methyldichloride,
(1-Phospha-2,3,4,5-tetramethylcyclopentadienyl)zirconium trihydride,
(1-Phospha-3,4-diphenylcyclopentadienyl)zirconium trichloride,
(1-Phospha-3,4-diphenylcyclopentadienyl)zirconium trimethyl,
(1-Phospha-3,4-diphenylcyclopentadienyl)zirconium tribenzyl,
(1-Phospha-3,4-diphenylcyclopentadienyl)zirconium methyldichloride,
(1-Phospha-3,4-diphenylcyclopentadienyl)zirconium trihydride,
(1-Phospha-3,4-dimethylcyclopentadienyl)zirconium trichloride,
(1-Phosphaindenyl)zirconium trichloride,
(1-Phospha-3-methoxycarbonylcyclopentadienyl)zirconium trichloride,
(1,3-Diphospha-4,5-diphenylcyclopentadienyl)zirconium trichloride,
(1,2,4-Triphospha-3,5-diphenylcyclopentadienyl)zirconium trichloride,
(1,2,3,4-Tetraphospha-5-phenylcyclopentadienyl)zirconium trichloride,
(Pentaphosphacyclopentadienyl)zirconium trichloride,
(1-Phospha-3-benzoyloxycyclopentadienyl)zirconium trichloride,
(Imidazolyl)zirconium trichloride,
(Imidazolyl)zirconium trimethyl,
(Imidazolyl)zirconium tribenzyl,
(Imidazolyl)zirconium methyldichloride,
(Imidazolyl)zirconium trihydride,
(Pyrazolyl)zirconium trichloride,
(1,2,3-triazolyl)zirconium trichloride,
(1,2,4-triazolyl)zirconium trichloride,
(Tetrazolyl)zirconium trichloride, and
(Pentazolyl)zirconium trichloride.

Of course, substituents for L must have a reactive site for attachment to the silicon atom of the desired compound.

Alternatively L and/or L' may contain a 1,2-azaborolinyl ring of the formula

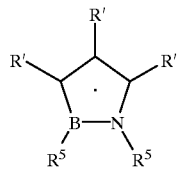
(VII)

In such formulations, the $R^5$ group is preferably alkyl from $C_3$ to $C_{12}$ or aryl, or trimethylsilyl, and the R' group is preferably hydrogen or methyl.

Examples of fused ring structures that can be used include

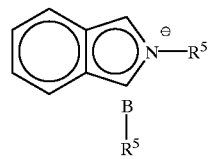
(XVII)

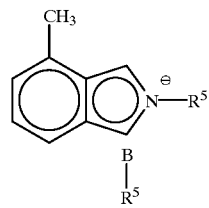
(XVIII)

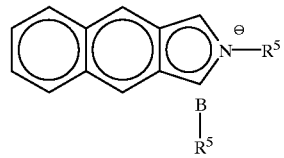
(XIX)

Lastly, L and/or L' may be a ligand containing a bora-benzene ring. A bora-benzene ring has the structure

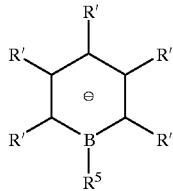
(XIV)

Examples of such ligands include

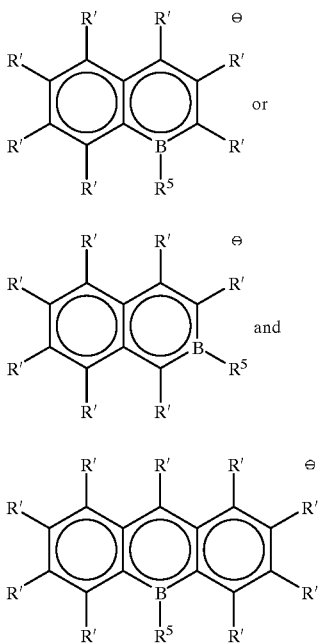

referred to as bora-naphthalene and bora-anthracene, respectively.

The catalysts of the invention are normally used in combination with a co-catalyst. Such cocatalysts (or activators) are any compound or component which can activate the catalyst. Representative co-catalysts include alumoxanes and aluminum alkyls of the formula $Al(R_7)_3$ where $R^7$ independently denotes a $C_1$–$C_8$ alkyl group, hydrogen or halogen. Exemplary of the latter of such co-catalysts are triethylaluminum, trimethylaluminum and tri-isobutylaluminum. The alumoxanes may be represented by the cyclic formulae $(R^{15}$—Al—O$)_9$ and the linear formula $R^{15}(R^{15}$—Al—O$)_sAlR^{15}$ wherein $R^{15}$ is a $C_1$–$C_5$ alkyl group such as methyl, ethyl, propyl, butyl and pentyl and g is an integer from 1 to about 20. Preferably, $R^{15}$ is methyl and g is about 4. Representative but non-exhaustive examples of alumoxane co-catalysts are (poly) methylalumoxane (MAO), ethylalumoxane and diisobutylalumoxane.

The co-catalyst can further be tri-alkyl or aryl (substituted or unsubstituted) boron derivative, such as perfluorotriphenylboron as well as an ionizing activator, neutral or ionic, or compounds such as tri (n-butyl)ammoniumtetrakis (pentafluorophenyl) boron or trityltetrakisperfluorophenylboron which ionize the neutral metallocene compound. Such ionizing compounds may contain an active proton, or some other cation associated with but not coordinated or only loosely coordinated to the remaining ion of the ionizing compound. See, for instance, U.S. Pat. Nos. 5,153,157; 5,198,401; and 5,241,025, all of which are herein incorporated by reference.

The catalyst and co-catalyst may be injected separately into the reactor containing the monomer(s) to be polymerized. The molar ratio of co-catalyst to the supported catalyst of the invention may range from about 0.01:1 to about 100,000:1, preferably from about 1:1 to about 1,000:1, most preferably from about 5:1 to about 200:1.

The catalyst systems of the invention are useful in the production of homo- and co-polymers of olefins. Preferred as olefins are ethylene, propylene, butene and octene. Most preferred as olefin is ethylene. The catalyst is particularly useful in the production of copolymers of ethylene and unsaturated monomers such as 1-butene, 1-hexene, 1-octene; mixtures of ethylene and di-olefins such as 1,3-butadiene, 1,4-hexadiene, 1,5-hexadiene; and mixtures of olefins and unsaturated comonomers such as norbornene, ethylidene norbornene, and vinyl norbornene.

The catalyst systems of the invention are relatively homogeneous and, as such, are either liquids or are readily soluble in inert hydrocarbons. Such homogeneity offers greater control over the catalyst concentration. They can be utilized in a variety of different polymerization processes. For instance, they can be used in a liquid phase polymerization process (slurry, solution, suspension, bulk or a combination), or gas phase polymerization process. The processes can be used in series or as individual single processes.

The pressure in the polymerization reaction zones can range from about 15 psia to about 50,000 psia. The temperature can range from about 40° C. to about 300° C. Gas phase and slurry polymerizations of olefins are typically conducted at about 70° C. to about 105° C. Solution, suspension and bulk phase polymerizations of olefins is normally conducted at temperatures of about 150° C. to about 300° C.

The catalysts of the invention further exhibit unusually high thermal stability, enabling their use over a very wide range of temperatures. In light of the homogeneity of the catalyst systems, they are particularly useful for the polymerization of olefins in solution phase.

When added to inorganic filler, such as clay, the catalysts of the invention may be employed to produce homogeneous polyolefins having a high degree of uniformity in particle size.

The catalysts of the invention are prepared in multi-step synthesis. In the first step, a polysiloxane oil is reacted with halogen (preferably either bromine or chlorine) to replace at least some of the hydrogens on the silicon atom with the halogen.

The polysiloxane oil is preferably one having the formula:

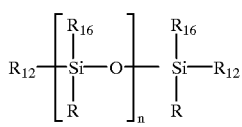

(XXIII)

where each $R_{12}$ and $R_{16}$ are independently selected from —H and —R; each R is independently selected from the substituents for R as defined above, n is as defined above, the ratio of R to H in $R_{16}$ is 0 to 100. Examples of R groups include methyl, ethyl, isopropyl, butyl, $CF_3$, vinyl, and phenyl. Methyl is preferred as those polysiloxane oils are more readily available. The preferred ratio of R to H in $R_{16}$ is 0 to 5 as at a ratio over 5 there are too few active sites in the catalyst. The number of repeating units, n, is preferably 10 to 100 because smaller polysiloxane oils are too volatile and larger polysiloxane oils are more difficult to react and have poorer solubility.

The above-described polysiloxane oils are commercially available in a variety of molecular weights and degrees of hydrogenation.

The silicone oil from which the compound of formula (II) is derived is preferably one having a viscosity at 25° C. of between 1 to 1,000 cst.

Preferably, 80 to 100% of the hydrogens are replaced, as if fewer hydrogen atoms are replaced the catalyst is less functionalized. Chlorine is preferred to bromine because it is less expensive. While this reaction will occur without a solvent, it is preferable to perform the reaction in a non-reactive solvent such as carbon tetrachloride, methylenechloride, dichloroethane, or carbon disulfide. The solution is preferably about 5 to about 30 wt % polysiloxane and the remainder solvent. The reaction proceeds rapidly at about 0 to about 60° C. and, in the case of bromine, can be monitored by the disappearance of color. If a solvent is used, it should be removed by vacuum distillation after the reaction is over so that it does not react in the next step. The halogenated polysiloxane product is a yellow oil having the formula

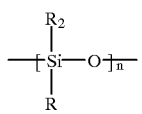

(I)

where each $R_2$ is independently selected from H, R, and Br or Cl.

In the next step, the halogenated polysiloxane produced in the first step is dissolved in a solvent inert to base such as tetrahydrofuran, diethylether, or toluene. Both the halogenated polysiloxane and the reagents used should be soluble in the solvent. The solution is preferably about 5 to about 30% halogenated polysiloxane and the remainder solvent. To the solution is added a compound having the formula LyM', where M' is generally a Group I or II metal, y is the valence of M, and L is as defined above. Exemplary of compounds of the formula LyM' is CpLi.

The reaction forms M'Xy and a protonated polymeric oil having the formula

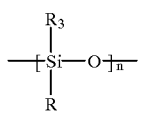

(XXIV)

where each $R_3$ is independently selected from H, R, and H•L and the ratio of H to H•L in $R_3$ is generally from 0 to about 4. The amount of $L_yM'$ used should be stoichiometric with the number of chlorine or bromine atoms on the halogenated polysiloxane.

Examples of $L_yM'$ compounds include cyclopentadienyl lithium, dicyclopentadienyl magnesium, indenyl lithium, fluorenyl lithium, and tetramethyl cyclopentadienyl lithium. The preferred $L_yM'$ compound is cyclopentadienyllithium. This reaction will proceed to nearly 100% completion at −78° C. to room temperature, preferably at about −78° C. to about 0° C.

In the next step in preparing the catalyst, the hydrogen atom on the H•L ligand is removed to produce an L ligand. This is accomplished using a deprotonating agent such as alkyllithium, metallic sodium, sodium hydride, metallic potassium, or potassium hydride. The amount of deprotonating agent is preferably about stoichiometric with the hydrogen on the H•L ligand. This reaction can be performed in the same solvent and it occurs rapidly to nearly 100% completion at −78° C. to room temperature, though preferably temperatures used are less than 0° C.

The resulting deprotonated polymeric oil has the formula

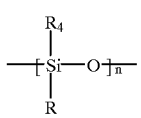

(XXVa)

where each $R_4$ is independently selected from H, R, and L.

In the final step, the deprotonated polymeric oil may be reacted with a compound having the formula

(XXVb)

Examples of $M^pL_r'X_{p-r-1}$ compounds include $ZrCl_4$, $CpZrCl_3$, $InZrCl_3$, $FlZrCl_3$, $ZrBr_4$, $TiCl_4$, and $CpTiCl_3$, where In is indenyl and Fl is fluorenyl. The particularly preferred compounds are $ZrCl_4$. The $M^pL_r'X_{p-r-1}$ compound is preferably added stoichiometrically with the number of L ligands on the deprotonated polymeric oil. This reaction proceeds nearly to completion and can be performed in the same solvent at −78° C. to room temperature; it is also preferably performed at less than 0° C. The reaction mixture should be stirred for about 5 to about 16 hours and the solvent can then be removed by vacuum distillation. The resulting catalyst has the formula

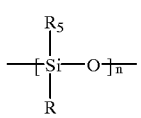

(XXVI)

To prevent crosslinking of the polymer and for ease of handling, it is preferable to dissolve the catalyst in a solvent, preferably the solvent used in the polymerization, typically toluene or hexane.

A typical reaction scheme for use in the invention is represented below:

(A)

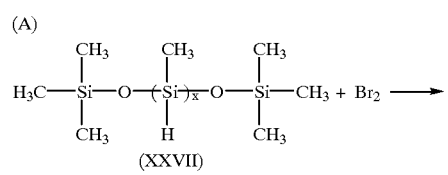

(XXVII)

(XXVIII)

(B)

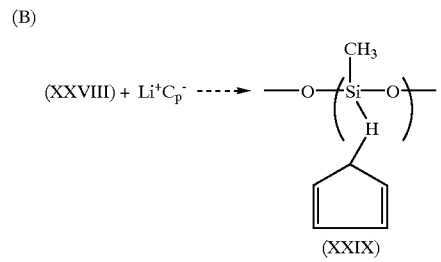

(XXIX)

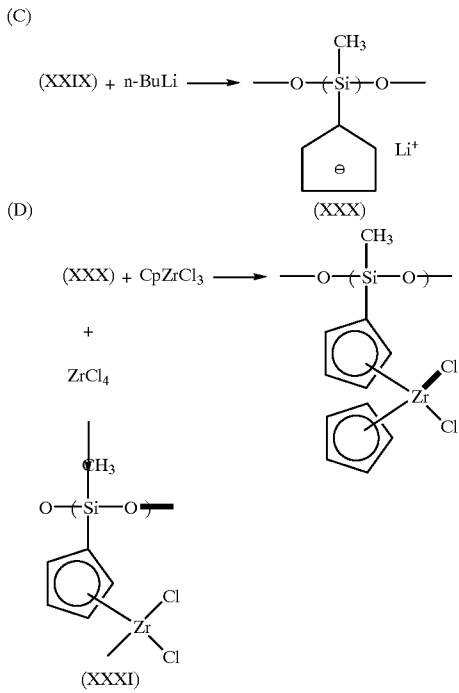

In an alternative method of production, the metal compound of formula:

$$M^pX'_p$$

is reacted with a deprotonated polymeric oil of the formula:

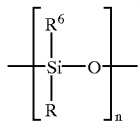

to render the resulting catalyst.

The substituent $R^6$ is hydride, R, or $R^7$ radicals wherein at least one $R^6$ is $R^7$; $R^7$ being a ligand represented by the formula —$L^2$—Z—$R^8$, wherein $L^2$ is a monoanionic ancillary ligand covalently bonded to Si, $R^8$ is a monoanionic or neutral ancillary ligand, and Z is a covalent group bridging $L^2$ and $R^8$; X' is independently selected from the group consisting of hydride, halide, alkoxy, aryloxy, alkylsulfonate, arylsulfonate or $(R)_2N$— radicals; suitable groups for $L^2$ and $R^8$ being those recited for L and L' above; and M, p, R, Z and n being as described above.

The following examples will illustrate the practice of the present invention in its preferred embodiments. The examples are provided to illustrate the invention and not to limit it. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLE 1

To a solution of 4.51 g of (30–35%) methylhydro-(65–70%) dimethylsiloxane [Huls America Inc., MW=2000–2100] in 40 ml $CCl_4$, was added 0.0094 moles of $Br_2$ solution in 1.3 ml $CCl_4$ at room temperature. After all the bromine had reacted, the volatiles from the reaction mixture were removed in vacuo, resulting in 5.0 g of a yellow oil. The brominated polysiloxane was dissolved in 20 ml. tetrahydrofuran (THF) and 0.977 g (0.0094 mol.) of cyclopentadienyl lithium solution in 40 ml was added slowly to the solution at −78° C. The mixture was again cooled to −78° C. and a solution of 0.0094 moles of butyllithium deprotonating agent (1.6 M solution in hexanes) was added. After stirring for 30 minutes at the temperature of dry ice, the mixture was warmed to room temperature and stirred an additional 30 minutes. The mixture was cooled to −78° C. and 1.095 g (0.0047 mol.) of $ZrCl_4$ was added as a powder (addition tube rinsed with 20 ml of abs. THF) and stirred 1 hour at this temperature. The mixture was stirred 16 hours at room temperature and the solvent was removed under reduced pressure. The brown oily residue was dissolved in 40 ml of toluene and the solution was filtered. After removal of the toluene in vacuo, 5.3 g of brown oil was isolated. This catalyst has the formula

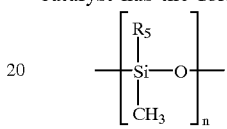

where $R_5$ is about 15% H, 70% $CH_3$, and 15%

(XXVI)

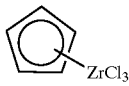

and n is about 29.

EXAMPLE 2

To a slurry of 6.7 g montmorillonite K-10 (dried 1 hour at 200° C.) in 30 ml of toluene, 7 ml of PMAO (8.7 wt % Al) was added and the mixture was stirred for 2 hours. The solution of 2.6 g of polysiloxane bonded catalyst from Example 1 in 60 ml of toluene was added to the clay slurry and stirred for 3 days. Toluene was removed in vacuo.

EXAMPLE 3

All polymerizations in this study were conducted in a 1.7 l reactor at 80° C. Prior to conducting a polymerization, the reactor was "baked-out" by heating to 130° C. and holding at that temperature for 30 minutes under a nitrogen purge. Ethylene, hydrogen, butene, and nitrogen were treated by passage through columns containing 13X molecular sieves. The reactor was charged with 0.850 l of hexane or toluene and, using a syringe, the required volume of diluted PMAO (AKZO). The desired amount of hydrogen was added to the reactor by monitoring the pressure drop (−P) from a 1 l stainless steel vessel pressurized with hydrogen. The reactor was maintained at isothermal conditions throughout the run. Ethylene was admitted to the reactor and controlled at 150 psi with feed on demand via a pressure regulator. After the reactor temperature and pressure stabilized, a 0.1 wt/vol % solution of the catalyst was charged into the reactor by nitrogen over pressure and polymerization initiated. Ethylene flow was monitored via a Brooks mass flow meter.

Polymerization was terminated by venting the reactor and the polymer was recovered by filtration. The polymer was stabilized by the addition of about 1000 ppm of butylated hydroxytoluene/hexane (BHT) and further devolatilized 2 hours at 80° C. in a vacuum oven.

The following table gives the reaction conditions and the results. The melt index (MI) of the resulting polymers was measured according to ASTM D-1238, Condition E, measured with a 2.16 kg weight. Catalyst efficiency is defined as the number of g of polyolefin per gram of M in one hour.

| Run | Catalyst Preparation | Solvent | Butene (gms) | Catalyst (mgs) | Molar Ratio Al/M | H₂, ΔP | Reaction Time (min) | Yield (g PE) | Catalyst Efficiency | MI |
|---|---|---|---|---|---|---|---|---|---|---|
| 1 | Ex 1 | Toluene | 10 | 100 | 2275 | 5 | 5 | 50 | 1240 | 965 |
| 2 | Ex 2 | Hexane | 0 | 83 | 500 | 10 | 30 | 5 | 4381 | >2700 |
| 3 | Ex 2 | Hexane | 0 | 88 | 500 | 10 | 60 | 43 | 17057 | >2700 |

The above table shows that the catalysts of this invention are effective in making polyethylene.

EXAMPLE 4

To a solution of 5.0 g of PMHS in 50 ml of $CCl_4$ is added 0.010 moles of $Br_2$ in 1.4 ml $CCl_4$ at room temperature. After the brown color of the $Br_2$ fades, the volatiles are removed by vacuum. The resulting oil is dissolved in about 25 ml of THF and is cooled to −78° C. To the cooled solution, 0.010 moles of lithium trimethylcyclopentadienide is added. While maintaining −78° C., 0.011 moles of n-butyl lithium is added to the solution followed by the addition of 0.010 moles of (N-t-butylamino) (dimethyl)silane chloride. To form the dianionic ligand, 0.022 moles of n-butyl lithium is then added at −78° C. followed by 0.010 moles of $TiCl_4$. The mixture is then allowed to warm to room temperature and stirred for 16 hours. Using reduced pressure, the solvent is removed. Toluene is then added to dissolve the oil and the solution is filtered to render the compound of the formula:

(XXXIII)

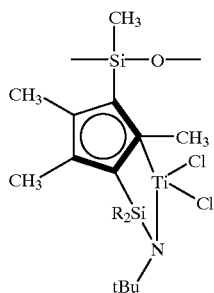

EXAMPLE 5

To a solution of 5.0 g of PMHS in 50 ml of $CCl_4$ is added 0.010 moles of $Br_2$ in 1.4 ml $CCl_4$ at room temperature. After the brown color of the $Br_2$ fades, the volatiles are removed by vacuum. The resulting oil is dissolved in about 25 ml of THF and is cooled to −78° C. To the cooled solution, 0.010 moles of lithium cyclopentadienyl is added. The solution is stirred for one hour followed by the addition of 0.011 moles of n-butyl lithium at −78° C. While stirring, the solution is allowed to warm to room temperature. The solution is again cooled to −78° C. and 0.010 moles of (1-t-butyl-2-methyl-1,2-azaborolinyl)zirconium trichloride is added as a solid. The solution is allowed to warm to room temperature while stirring. After stirring 16 hours, the volatiles are removed under vacuum leaving an oil. The oil is dissolved in toluene and the solution filtered to render a compound of the formula:

(XXXIV)

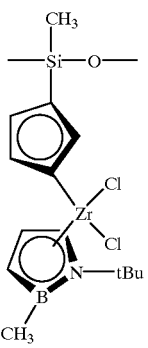

EXAMPLE 6

To a solution of 5.0 g of PMHS in 50 ml of $CCl_4$ is added 0.010 moles of $Br_2$ in 1.4 ml $CCl_4$ at room temperature. After the brown color of the $Br_2$ fades, the volatiles are removed by vacuum. The resulting oil is dissolved in about 25 ml of THF and is cooled to −78° C. To the cooled solution, 0.010 moles of lithium cyclopentadienyl is added. The solution is allowed to warm to room temperature and stirred for one hour. The solution is then cooled to −78° C. and 0.011 moles of n-butyl lithium is then added. After stirring for an additional hour, the solution is cooled to −78° C. and 0.010 moles of (2,3,4,5-tetramethylphospholyl)$ZrCl_3$ is added. The solution is allowed to warm to room temperature while stirring. After stirring 16 hours, the volatiles are removed under vacuum leaving an oil. The oil is dissolved in toluene and the solution filtered to render the compound of the formula:

(XXXV)

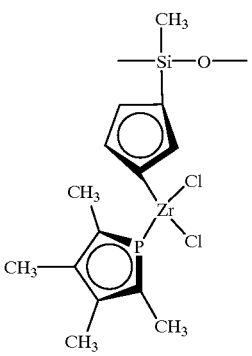

EXAMPLE 7

To a solution of 5.0 g of PMHS in 50 ml of $CCl_4$ is added 0.010 moles of $Br_2$ in 1.4 ml $CCl_4$ at room temperature. After the brown color of the $Br_2$ fades, the volatiles are removed by vacuum. The resulting oil is dissolved in about 25 ml of THF and is cooled to −78° C. To the cooled solution, 0.010 moles of lithium (1-5-butyl-2-methyl-1,2-azaborolinyl) is added. The solution is stirred for one hour followed by the addition of 0.011 moles of n-butyl lithium at −78° C. While stirring, the solution is allowed to warm to room temperature. The solution is again cooled to −78° C. and 0.010 moles of CpZrCl₃ is added as a solid. The solution is allowed to warm to room temperature while stirring. After stirring 16 hours, the volatiles are removed under vacuum leaving an oil. The oil is dissolved in toluene and the solution filtered to render the compound of formula:

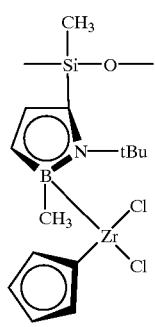

(XXXI)

EXAMPLE 8

To a solution of 5.0 g of PMHS in 50 ml of CCl₄ is added 0.010 moles of Br₂ in 1.4 ml CCl₄ at room temperature. After the brown color of the Br₂ fades, the volatiles are removed by vacuum. The resulting oil is dissolved in about 25 ml of THF and is cooled to −15° C. To the cooled solution, 0.010 moles of (3,4-dimethylphospholyl) magnesium bromide is added. The solution is allowed to warm to room temperature and stirred for two hours. The solution is then cooled to −78° C. and 0.011 moles of n-butyl lithium is then added. After stirring for an hour after the addition is complete, the solution is cooled to −78° C. and 0.010 moles of CpZrCl₃ is added as a solid. The solution is allowed to warm to room temperature while stirring. After stirring 16 hours, the volatiles are removed under vacuum leaving an oil. The oil is dissolved in toluene and the solution filtered to render a compound of the formula:

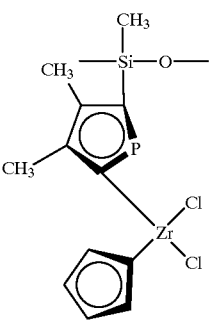

(XXXVII)

What is claimed is:

1. A supported catalyst which comprises:
   (a) a Group 3 to 10 transition or lanthanide metal;
   (b) a modified polysiloxane support; and
   (c) a monoanionic aromatic ligand that is π-bonded to the metal and covalently bound to a silicon atom of the polysiloxane support;
   wherein the ligand is selected from the group consisting of boraaryl, pyrrolyl, phospholyl, indolyl, carbazolyl, imidazolyl, pyrazolyl, triazolyl, tetrazolyl, and azaborolinyl.

2. The catalyst of claim 1 comprising a Group 4 to 6 transition metal.

3. A catalyst system which comprises the catalyst of claim 1 and a cocatalyst.

4. The catalyst system of claim 3 wherein the cocatalyst is an alumoxane or an ionic borate.

5. The catalyst of claim 1 wherein the monoanionic aromatic ligand is selected from the group consisting of boraaryl, pyrrolyl, indolyl, and azaborolinyl.

* * * * *